(12) United States Patent
Kruempelmann (10) Patent No.: US 9,792,342 B2
(45) Date of Patent: Oct. 17, 2017

(54) COPY PROCEDURE TO REDUCE DOWNTIME FOR A SOURCE SYSTEM

(71) Applicant: Wulf Kruempelmann, Altlussheim (DE)

(72) Inventor: Wulf Kruempelmann, Altlussheim (DE)

(73) Assignee: SAP SE, Walldorf (DE)

( * ) Notice: Subject to any disclaimer, the term of this patent is extended or adjusted under 35 U.S.C. 154(b) by 436 days.

(21) Appl. No.: 14/539,413

(22) Filed: Nov. 12, 2014

(65) Prior Publication Data

US 2016/0132577 A1 May 12, 2016

(51) Int. Cl.
*G06F 17/30* (2006.01)

(52) U.S. Cl.
CPC .. *G06F 17/30575* (2013.01); *G06F 17/30289* (2013.01); *G06F 17/30578* (2013.01)

(58) Field of Classification Search
CPC .................................................. G06F 17/30578
See application file for complete search history.

(56) References Cited

U.S. PATENT DOCUMENTS

| | | | | |
|---|---|---|---|---|
| 2005/0193041 | A1* | 9/2005 | Bourbonnais | G06F 17/30578 |
| 2009/0292745 | A1* | 11/2009 | Bose | G06F 17/30569 |
| 2013/0173547 | A1* | 7/2013 | Cline | G06F 17/303 |
| | | | | 707/638 |
| 2015/0112923 | A1* | 4/2015 | Driesen | G06F 17/30377 |
| | | | | 707/609 |

* cited by examiner

*Primary Examiner* — Kris Mackes
(74) *Attorney, Agent, or Firm* — Mintz Levin Cohn Ferris Glovksy and Popeo, P.C.

(57) ABSTRACT

A system, a method and a computer program product for performing a copy procedure are disclosed. A copy procedure that copies a table in a plurality of tables stored at a source system to a target system is initiated. At least one table in a plurality of tables stored at the source system is selected for copying from the source system to the target system. A trigger table containing at least one trigger is generated. The trigger indicates at least one change made to the at least one selected table. The trigger table is copied from the source system to the target system. The selected table is copied from the source system to the target system. Using the copied trigger table, changes are applied to the table copied to the target system.

15 Claims, 6 Drawing Sheets

COPY PROCEDURE TO REDUCE DOWNTIME FOR A SOURCE SYSTEM

TECHNICAL FIELD

The subject matter described herein generally relates to data processing, and in particular, to performing a copy procedure between systems in a reduced downtime.

BACKGROUND

Data is important to operations of many companies, whether large or small. On regular basis, businesses rely, use, process and/or store vast amounts of data that can be related to businesses' finances, operations, logistics, customers, and many other aspects of their operations. Proper storage of data and fast access to such data are important to smooth operations of the businesses.

Additionally, companies rely on software applications that also assist companies in their operations. Such software applications can involve various business processes that can implement and/or use business objects that can contain data. Oftentimes, companies perform copying of their computing systems, which can include applications, data, etc. from one system (e.g., a source system) to another system (e.g., a tenant system). Copies can be performed for a variety of reasons, such as testing, development, backup, etc.

In view of large amounts of data that is stored by companies, copy procedures can typically consume a significant amount of time and can cause downtime of the source system from which data, applications, etc. is being copied. The downtime can increase with an amount of data, applications, etc. that is being copied as well as a number of target tenant systems. This downtime can prevent users (e.g., actual users, other business processes, etc.) of the source system from performing their operations. Moreover, even if users of the source system are capable of continuing their operations, any changes that may be made to the source system during the copy procedure might not be accurately reflected in the target system. This can cause improper operation of the target system, increased processing delays, further downtime, increased operational costs, and/or many other issues. Thus, there is a need to provide for an ability to perform a copy procedure that is capable of reducing downtime for the source system in a single and/or multi-tenant computing environment.

SUMMARY

In some implementations, the current subject matter relates to a computer-implemented method for performing a copy procedure to reduce downtime of a source system. The method can include initiating a copy procedure that copies at least one table in a plurality of tables stored at a source system to a target system, selecting at least one table in a plurality of tables stored at the source system for copying from the source system to the target system, generating a trigger table containing at least one trigger, the trigger being indicative of at least one change made to the at least one selected table, copying the trigger table from the source system to the target system, copying the at least one selected table from the source system to the target system and applying, based on the copied trigger table, the at least one change to the at least one table in the plurality of tables stored at the target system. At least one of the initiating, the selecting, the generating, the copying the trigger table, and the copying the at least one table from the source system to the target system can be performed using at least one process of at least one computing system.

In some implementations, the current subject matter can include one or more of the following optional features. The initiating of the copy procedure can include determining whether the source system is compatible with the target system and wherein upon determination of compatibility, the copy procedure can be initiated. Upon determination that the target system is not compatible with the source system, the copy procedure can be terminated.

In some implementations, at least one change can include at least one of the following: an insert operation, a delete operation, and an update operation. The trigger table can include at least one change pointer key indicative of the at least one change. The table can be selected from a data dictionary of the source system.

In some implementations, the method can also include deleting the trigger table after the at least one change is applied to the at least one table at the target system.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

In some implementations, the current subject matter relates to performing a copy procedure of database tables stored at the source system to a target system. The copy procedure can be performed in way that it reduces or eliminates downtime of the source system. The source system and a target system can be referred to as tenants that exist in a multi-tenant environment. A tenant can be a set of data that can describe a business of a company in a computing system, where the computing system can be implemented by several other companies in parallel. The data can be disjoint between the different tenants within the computing system. The copy procedure can copy some or all data of a tenant. The data can be copied for a variety of reasons, such as, for example, testing, development, operations, design, runtime, backup, etc. In some implementations, data can be stored at a source system (i.e., from which a copy can be made) in tables. Data in tables can be stored in a row-column format (e.g., using a key-value pair), where data in one table can relate to data in another table. Thus, a change (such as by a user, an application, etc.) to the data stored in one table can affect the data stored in another table.

In some implementations, the current subject matter relates to providing an ability to perform table changes using a copy procedure in a reduced downtime fashion. Such ability can be relevant to various on-demand software. On-demand software is also known as a software-as-a-service ("SaaS"), which can be accessed by users using a thin client via a web browser. On-demand software can be a delivery model for many business applications, e.g., office and messaging software, payroll processing software, database management ("DBMS") software, management software, development software, gamification, virtualization, accounting, collaboration, customer relationship management ("CRM"), management information systems ("MIS"), enterprise resource planning ("ERP"), invoicing, human resource management ("HRM"), content management ("CM") and/or service desk management.

As part of this on-demand software, there exists a strong desire to share various hardware of a system, running such on-demand software, between several customers. The sharing can be performed using information stored in a database associated with the customer's system. Databases can include a plurality of tables that contain various customer data arranged in columns and rows. In some database systems such as Advanced Business Application Programming ("ABAP"), as developed by SAP SE, Walldorf, Germany, database tables can be defined in data dictionaries ("DDICs").

A data dictionary can centrally describe and manage data definitions used in the customer's system. The DDIC can include various data types, which are actual type definitions (e.g., elementary types, reference types, complex types, etc.) in the ABAP dictionary. The data elements (e.g., elementary types, reference types, etc.) in the ABAP dictionary can describe individual fields and specify types of columns in the database. The DDIC further includes structures which can be sequences of any other data types from the dictionary, e.g., data elements, structures, table types, and/or database tables. Each component in the structure can have a name and a data type. The dictionary can further include table types that can be blueprints for internal tables that are stored in the dictionary. The dictionary can include various other characteristics as well as views.

The ABAP system can typically include various tools that can be used to perform table conversions (such as in situations when there is data in table and a database system cannot execute a structural change to update the database table). To convert a database table, table's content can be read from the database to ABAP and converted to a new structure in ABAP and then written to a new database (DB) table. ABAP can provide additional logic for the structure conversion known as the ABAP command "MOVE CORRESPONDING". This function depends on the metadata provided by ABAP. On database layer, the metadata is not accessible in the database catalog. There are several ABAP types mapped to the same database types, but their conversion behavior depends on the ABAP definition, not only on the database definition.

As indicated above, the sharing of hardware between various customers running on-demand software can be accomplished using a field in a table of the ABAP database. In some implementations, the field can be a "client" field, which can include a unique identifier for each customer. Each customer can have its own internal client number. The sharing can be desired for the purposes of testing, implementations, and/or any other purposes.

Figure 1:
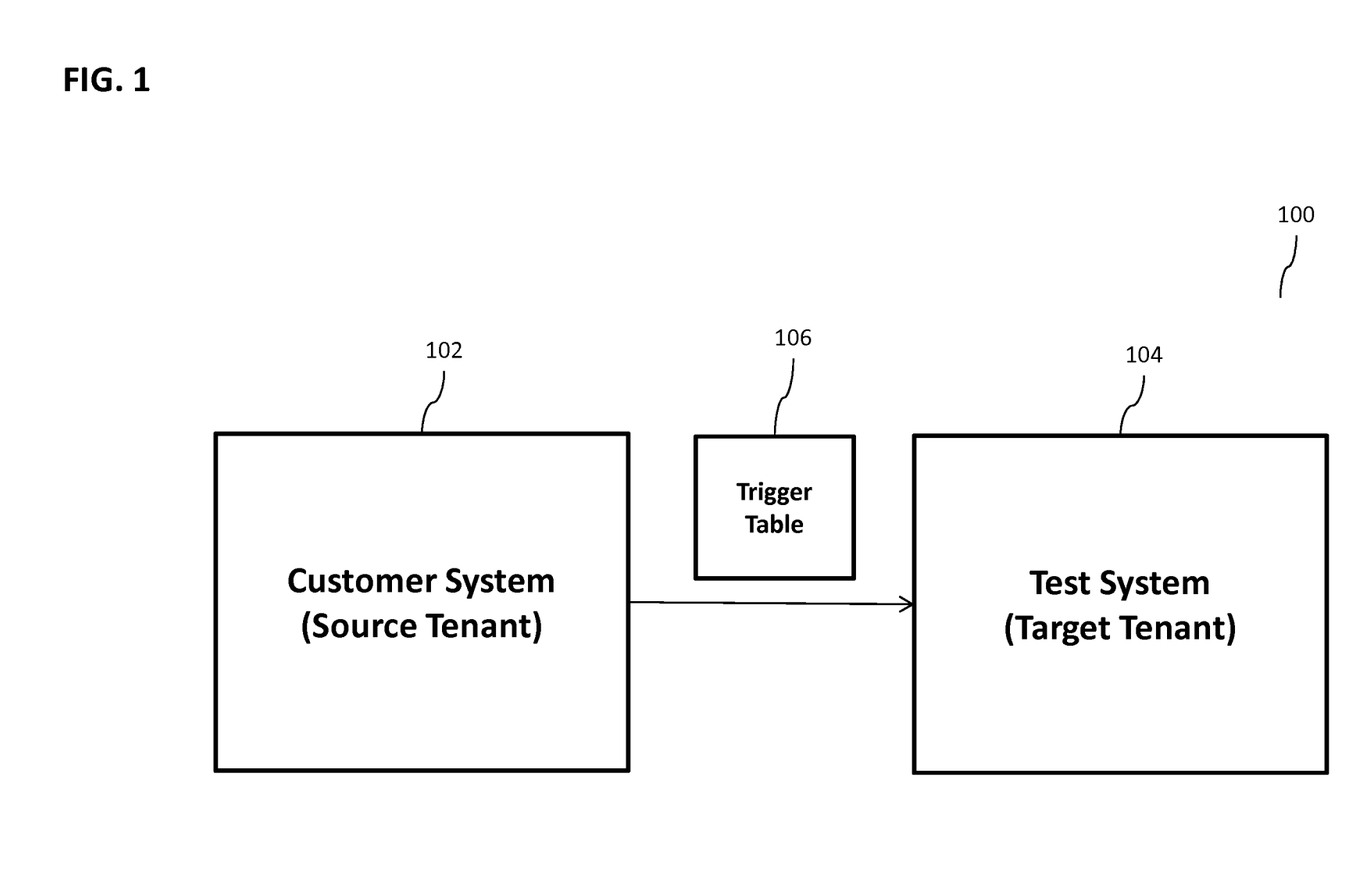
FIG. 1 is an exemplary system including a source tenant and a target tenant systems, according to some implementations of the current subject matter.

Thus, if a customer requires a tenant for testing a client (e.g., a business process, business object, a software, etc.), the client can be copied from the customer's system to a tenant system. FIG. 1 illustrates an exemplary system 100 for performing testing of client, according to some implementations of the current subject matter. The system 100 can be used for any other purposes and is not limited to testing. The system 100 can include a customer system 102 and a test system 104. To use the test system 104 for testing, one or more clients of the customer system 102 can be copied to the test system 104. In some implementations, the customer system 102 can be referred to as a source tenant and the test system 104 can be referred to as a target tenant. As part of the copying process, various select and insert operations can be performed, which can correspond to changes made to tables stored in the database(s). To avoid inconsistencies at the target tenant (such as when the data at the source tenant is updated while copying process is ongoing), the source tenant may need to be closed (thereby causing downtime).

In some implementations, to avoid closing of the source tenant, the current subject matter system can generate a trigger table 106 that contains information about changes that have been made to the database tables of the source tenant 102. Each change can be associated with a trigger that can in turn trigger changes to the target tenant 104 database tables to ensure consistency of the data. During performance of the copy procedure, the trigger table can be copied to the target tenant. Based on the trigger table, a copy of the source tenant to the target tenant can be performed in reduced downtime without closing of the source tenant. Since the database tables have been copied together with the trigger table, the changes that have been made to the source tenant's tables can be implemented in the copied tables at the target tenant based on the triggers that have been stored in the trigger table.

Figure 2:
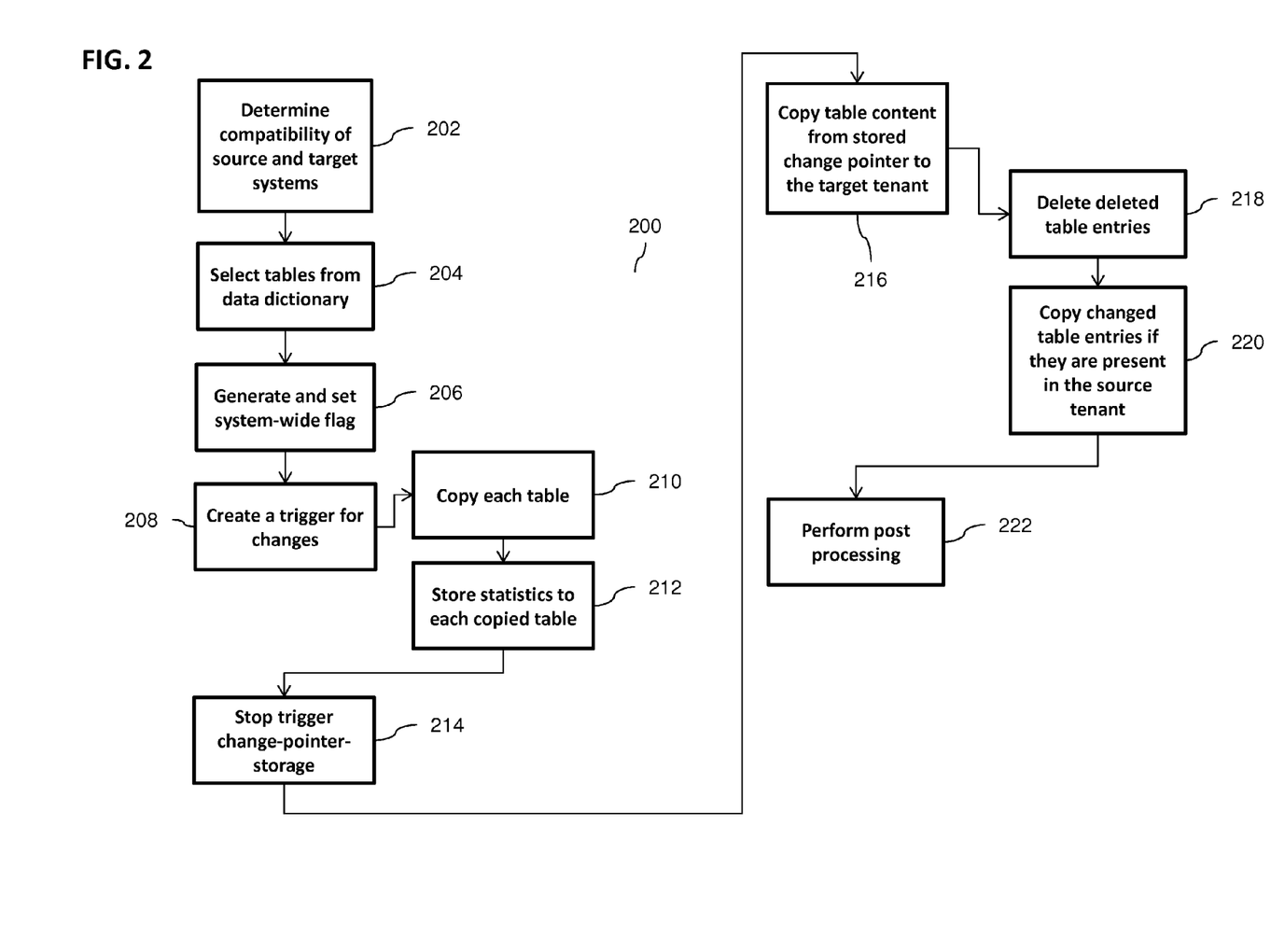
FIG. 2 is a flowchart illustrating an exemplary process for copying database tables from the source tenant to the target tenant, according to some implementations of the current subject matter.

FIG. 2 illustrates an exemplary process 200 for copying database tables from the source tenant 102 to the target tenant 104, according to some implementations of the current subject matter. The process 200 can begin by initializing a copy procedure.

At 202, the current subject matter system can determine whether or not the source tenant system 102 and the target tenant system 104 are compatible, i.e., whether database tables from the source tenant system can be copied to the target tenant system. In some implementations, the current subject matter system can determine whether software used by both systems is of an identical version and/or release. If it is not, the copy procedure may terminate and wait until both systems have an identical version/release of software installed. Additionally, the current subject matter system can also determine whether or not any and/or all system-wide extensions are present and/or identical. Further, the current subject matter system can also check for presence of database tables that are desired to be copied. If the source and target tenants are not compatible, the copy procedure can terminate. It can resume upon a determination that both systems are compatible. Alternatively, the copy procedure can be re-initiated.

Once compatibility is determined, database tables can be selected for copy, at 204. The database tables can be selected from the data dictionary associated with the source tenant system. After the tables are selected, at 206, a system-wide flag can be generated and set for invoking a trigger that can initiate copying of appropriate data to the target tenant. The system-wide flag can be set for all tables, as copying of a subset of tables can affect data in tables that are not being copied and hence, it may be necessary to update data in the tables that have not been copied. The flag can be set in a field FLAG of a TRIGGER_ACTIVE table. If the field contains an "X"", the copy of data identified by the trigger can be performed. Otherwise, copy will not be performed.

After setting the trigger, for all tables, a procedure can be created and executed that can be called by the trigger to initiate requisite updates (e.g., INSERT, UPDATE, DELETE) to the tables, at 208. In some implementations, the procedure can be written using an SQL-script and/or any other code. The procedure can determine whether data write-operations have been performed on a table that has been selected from the data dictionary. Then, the procedure can determine whether the trigger field includes a value of "X", i.e., it has been set to ON. If the trigger is ON, any data changes to the table that can be stored in a trigger transition stable cam be stored in a NEW_TABLE. If an INSERT and/or an UPDATE procedures have been performed on the table, a key and a content of the corresponding statement (i.e., value) can be stored into a table "TENANT_COPY_CHANGE_POINTER_KEYS." This table can contain pointers to locations where data in database tables of the source tenant has been inserted and/or updated. If the DELETE procedure has been performed on the table, a key and a content of the corresponding statement (i.e., value) can be stored into a table "TENANT_COPY_DELETE_POINTER_KEYS." This table can contain pointers to locations where data in database tables of the source tenant has been deleted.

Upon execution of the above procedure, the content of the table containing the changes/triggers in the source system can be copied to a table in the target tenant system 104. In some implementations, any normal copy procedures can be used, at 210. At 220, various table metadata that can include various table statistics (e.g., updates, insertions, deletions, etc.) can be stored along with the table at the target tenant system, at 212.

When copying of the change/trigger table is completed, the trigger change-pointer-storage routines can be terminated, at 214. This can be accomplished by changing the value of the trigger field in the trigger table from "X" to NULL. Further, upon completion of the copy procedure, the triggers pointing to the INSERT, UPDATE, and DELETE procedures that have been stored can be deleted.

To implement changes to the database tables at the target tenant system, the change/trigger table can be used, at 216. The change pointers that have been stored in the change/trigger table can be used to perform changes to the tables in the target tenant system 104. All changes that correspond to table entries that have been deleted in the source tenant system 102, can be deleted from the tables in the target tenant system, at 218. All changes that correspond to INSERT and/or UPDATE performed at the source tenant system, can be inserted and/or updated, respectively at the target tenant system, at 220.

At 222, various post processing procedures can be performed for the purposes of clean up. The above operations can be performed while the customer continues to work in the source tenant system, because changes to the tables which are copied at different times, can be corrected using change-pointer post copy. This can substantially reduce and/or eliminate downtime to the source tenant system.

In some implementations, the following code can be used to implement the above operations shown in FIG. 2:

```
CREATE TRIGGER TEST_TRIGGER_TAB_UPDATE
    AFTER UPDATE ON TARGET
    REFERENCING NEW TABLE mynewtab, OLD TABLE myoldtab
    FOR INSERT and UPDATE
    BEGIN
        SELECT TRIGGER_OK SAP.TRIGGER_ACTIVE
        If TRIGGER_OK = 'X'
            SELECT * FROM :mynewtab into :BLOB
            INSERT :Tenant :Tablename :BLOB INTO
            Tenant_copy_change_pointer_keys
        ENDIF
    END;
CREATE TRIGGER TEST_TRIGGER_TAB_DELETE
    AFTER UPDATE ON TARGET
    REFERENCING OLD TABLE myoldtab
    FOR DELETE
    BEGIN
        SELECT TRIGGER_OK SAP.TRIGGER_ACTIVE
        If TRIGGER_OK = 'X'
            SELECT * FROM :myoldtab into :BLOB
            INSERT :Tenant :Tablename :BLOB INTO
            Tenant_copy_DELETE_pointer_keys
        ENDIF
    END.
```

In some implementations, a structure for the table TENANT_COPY_CHANGE_POINTER_KEYS can be as follows:

| | |
|---|---|
| Tenant | Char3 |
| Tablename | Char64 |
| BLOB | XSTRING |

In some implementations, a post copy routine to copy content of TENANT_COPY_CHANGE_POINTER_KEYS to the target tenant system can be as follows (for example, as written in ABAP), where table IT_DDIC can contain all table names from copied tables:

```
Loop at IT_DDIC into IV_DDIC.
Select BLOB from Tenant_copy_DELETE_pointer_keys into BLOB
where tenant =
(Target_tenant) and tablename = IV_DDIC-Tablename .
Delete from (IV_DDIC_Tablename) where Key = BLOB-KEY.
```

-continued

```
Endselect.
Select BLOB from Tenant_copy_change_pointer_keys into BLOB
where tenant =
(Target_tenant) and tablename = IV_DDIC-Tablename .
Call function Check_tableEntry_in_source(Source,
IV_DDIC_Tablename, BLOB, EXIST)
If exist = TRUE.
Modify blob into (IV_DDIC-Tablename) with BLOB.
Endif.
Endselect.
Endloop.
```

In some implementations, the current subject matter can be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, can interact with the in-memory system for the purposes of accessing data, for example. Other systems and/or combinations of systems can be used for implementations of the current subject matter. The following is a discussion of an exemplary in-memory system.

Figure 3:
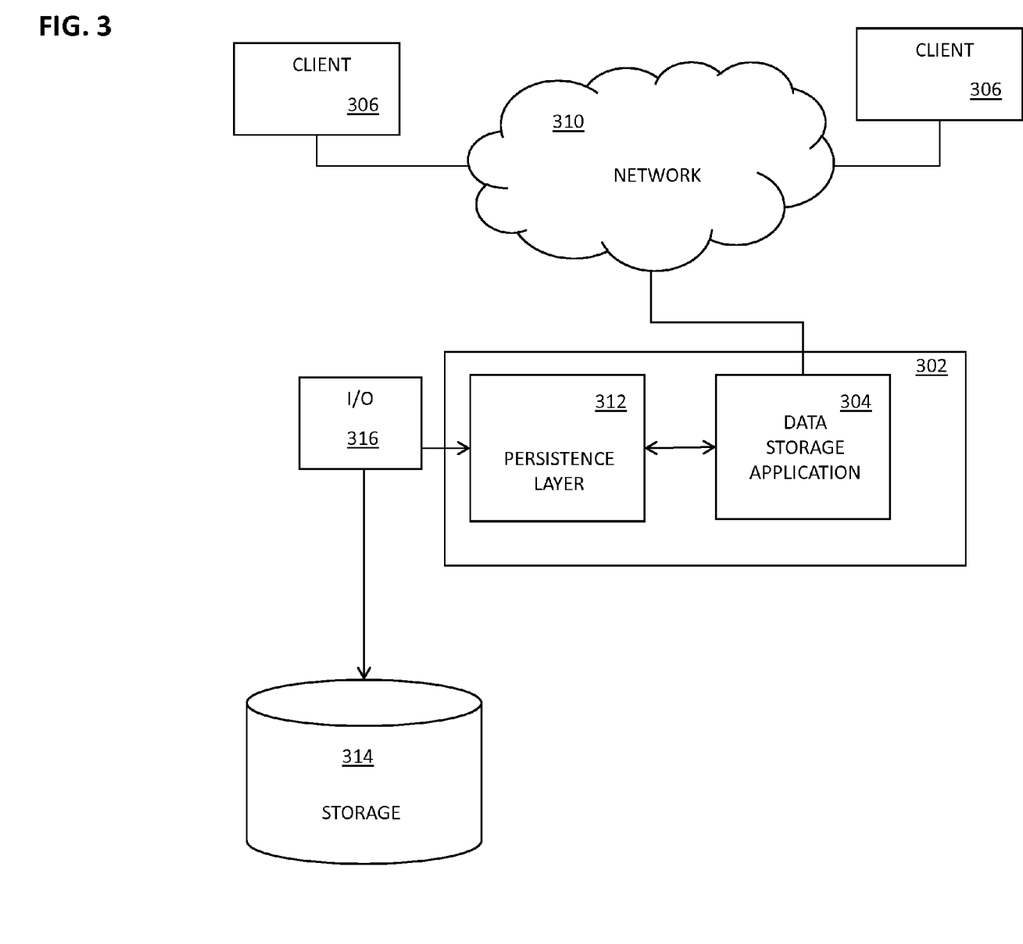
FIG. 3 is a diagram illustrating an exemplary system including a data storage application, according to some implementations of the current subject matter.

FIG. 3 illustrates an exemplary system 300 in which a computing system 302, which can include one or more programmable processors that can be collocated, linked over one or more networks, etc., executes one or more modules, software components, or the like of a data storage application 304, according to some implementations of the current subject matter. The data storage application 304 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 302 as well as to remote users accessing the computing system 302 from one or more client machines 306 over a network connection 310. One or more user interface screens produced by the one or more first modules can be displayed to a user, either via a local display or via a display associated with one of the client machines 306. Data units of the data storage application 304 can be transiently stored in a persistence layer 312 (e.g., a page buffer or other type of temporary persistency layer), which can write the data, in the form of storage pages, to one or more storages 314, for example via an input/output component 316. The one or more storages 314 can include one or more physical storage media or devices (e.g. hard disk drives, persistent flash memory, random access memory, optical media, magnetic media, and the like) configured for writing data for longer term storage. It should be noted that the storage 314 and the input/output component 316 can be included in the computing system 302 despite their being shown as external to the computing system 302 in FIG. 3.

Data retained at the longer term storage 314 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 4:
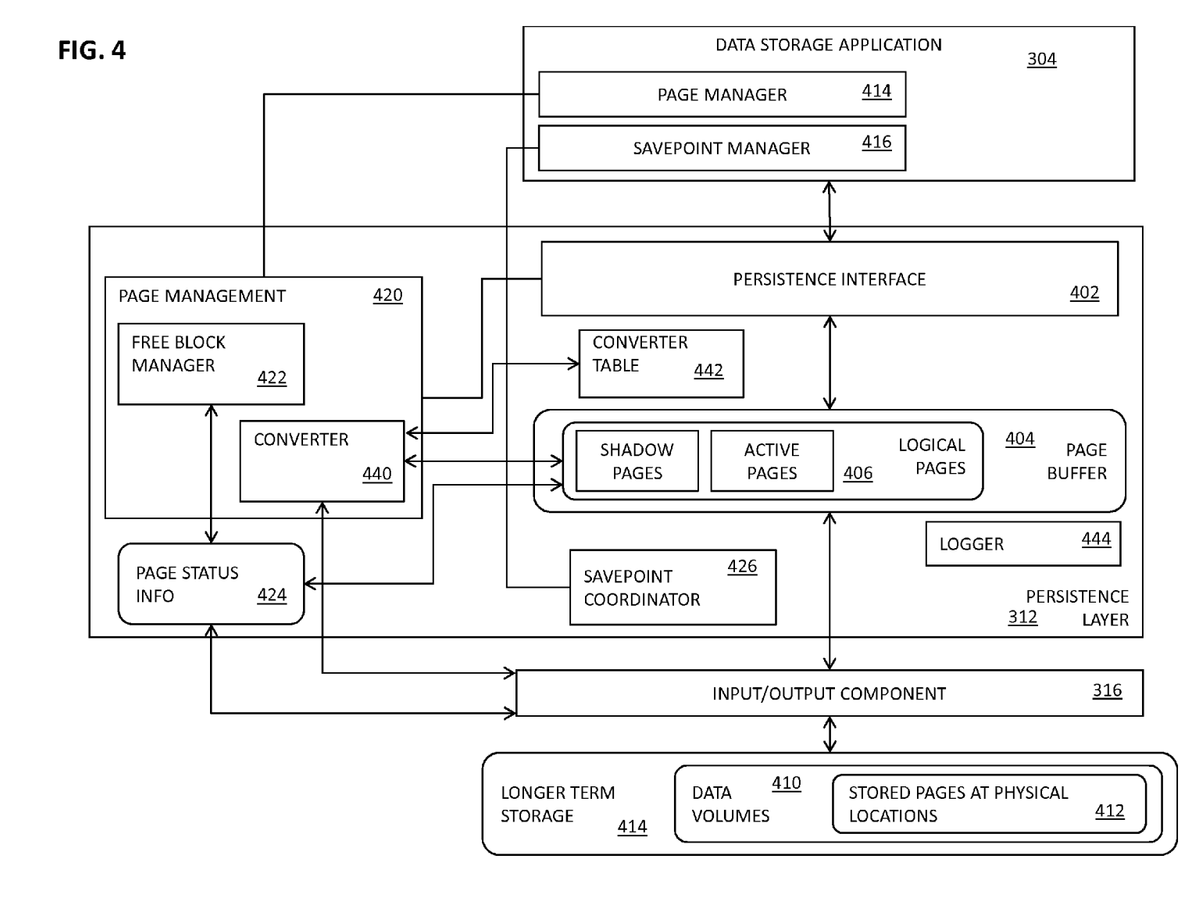
FIG. 4 is a diagram illustrating details of the system of FIG. 3.

FIG. 4 illustrates exemplary software architecture 400, according to some implementations of the current subject matter. A data storage application 304, which can be implemented in one or more of hardware and software, can include one or more of a database application, a network-attached storage system, or the like. According to at least some implementations of the current subject matter, such a data storage application 304 can include or otherwise interface with a persistence layer 312 or other type of memory buffer, for example via a persistence interface 402. A page buffer 404 within the persistence layer 312 can store one or more logical pages 406, and optionally can include shadow pages, active pages, and the like. The logical pages 406 retained in the persistence layer 312 can be written to a storage (e.g. a longer term storage, etc.) 314 via an input/output component 316, which can be a software module, a sub-system implemented in one or more of software and hardware, or the like. The storage 314 can include one or more data volumes 410 where stored pages 412 are allocated at physical memory blocks.

In some implementations, the data storage application 304 can include or be otherwise in communication with a page manager 414 and/or a savepoint manager 416. The page manager 414 can communicate with a page management module 420 at the persistence layer 312 that can include a free block manager 422 that monitors page status information 424, for example the status of physical pages within the storage 314 and logical pages in the persistence layer 312 (and optionally in the page buffer 404). The savepoint manager 416 can communicate with a savepoint coordinator 426 at the persistence layer 312 to handle savepoints, which are used to create a consistent persistent state of the database for restart after a possible crash.

In some implementations of a data storage application 304, the page management module of the persistence layer 312 can implement a shadow paging. The free block manager 422 within the page management module 420 can maintain the status of physical pages. The page buffer 404 can include a fixed page status buffer that operates as discussed herein. A converter component 440, which can be part of or in communication with the page management module 420, can be responsible for mapping between logical and physical pages written to the storage 314. The converter 440 can maintain the current mapping of logical pages to the corresponding physical pages in a converter table 442. The converter 440 can maintain a current mapping of logical pages 406 to the corresponding physical pages in one or more converter tables 442. When a logical page 406 is read from storage 314, the storage page to be loaded can be looked up from the one or more converter tables 442 using the converter 440. When a logical page is written to storage 314 the first time after a savepoint, a new free physical page is assigned to the logical page. The free block manager 422 marks the new physical page as "used" and the new mapping is stored in the one or more converter tables 442.

The persistence layer 312 can ensure that changes made in the data storage application 304 are durable and that the data storage application 304 can be restored to a most recent committed state after a restart. Writing data to the storage 314 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 444 can also be included to store the changes made to the data of the data storage application in a linear log. The logger component 444 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 444 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 312 can use a combination of undo log entries (from one or more logs) and shadow paging.

The persistence interface 402 can handle read and write requests of stores (e.g., in-memory stores, etc.). The persistence interface 402 can also provide write methods for writing data both with logging and without logging. If the logged write operations are used, the persistence interface 402 invokes the logger 444. In addition, the logger 444 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 444. For an entry of type "update", for example, this would be the identification of the affected record and the after image of the modified data.

When the data application 304 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 444 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 444 can write a database log (or simply referred to herein as a "log") sequentially into a memory buffer in natural order (e.g., sequential order, etc.). If several physical hard disks/storage devices are used to store log data, several log partitions can be defined. Thereafter, the logger 444 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 304 can use shadow paging so that the savepoint manager 416 can write a transactionally-consistent savepoint. With such an arrangement, a data backup comprises a copy of all data pages contained in a particular savepoint, which was done as the first step of the data backup process. The current subject matter can be also applied to other types of data page storage.

Figure 5:
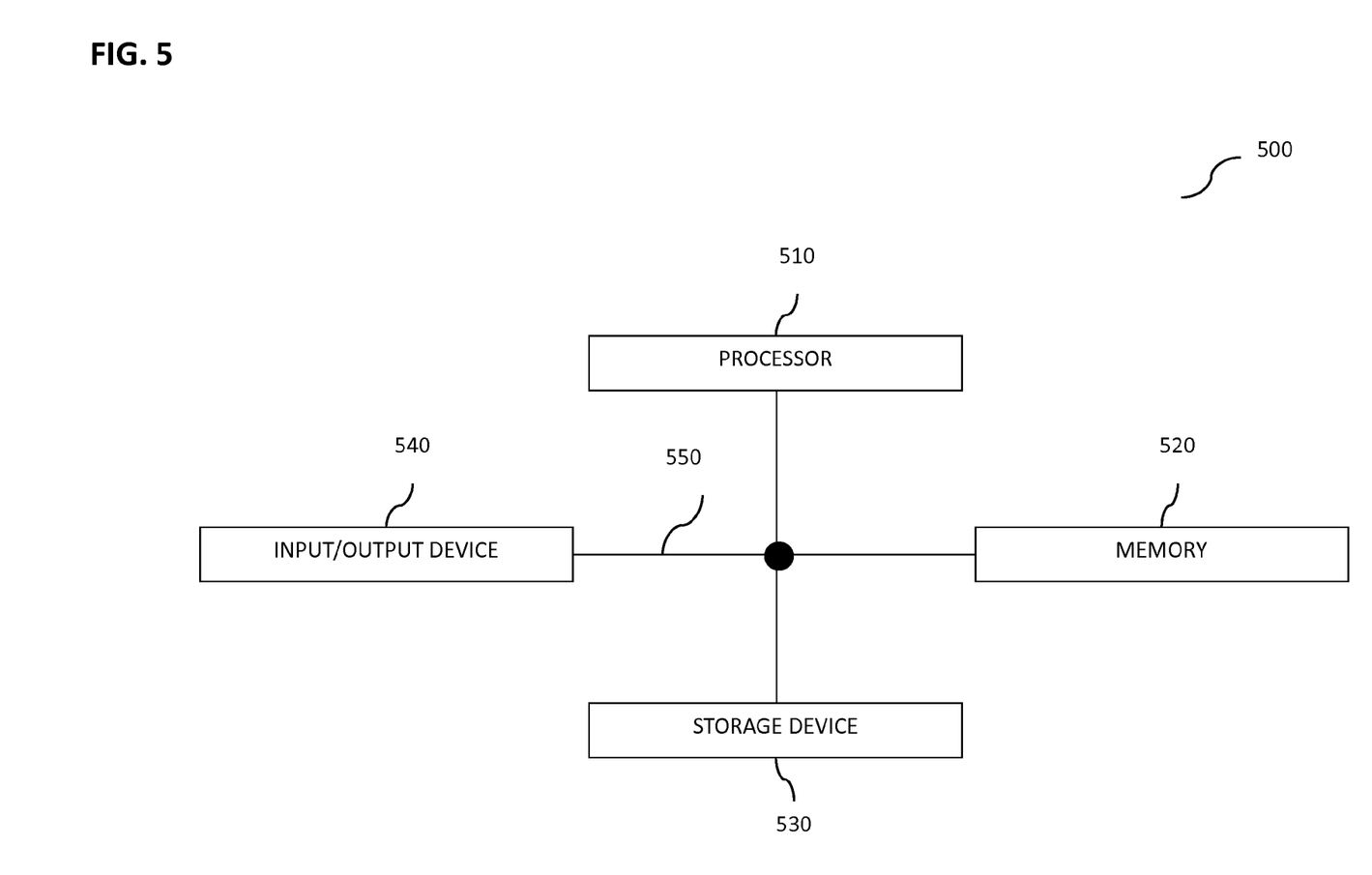
FIG. 5 is an exemplary system, according to some implementations of the current subject matter.

In some implementations, the current subject matter can be configured to be implemented in a system 500, as shown in FIG. 5. The system 500 can include a processor 510, a memory 520, a storage device 530, and an input/output device 540. Each of the components 510, 520, 530 and 540 can be interconnected using a system bus 550. The processor 510 can be configured to process instructions for execution within the system 500. In some implementations, the processor 510 can be a single-threaded processor. In alternate implementations, the processor 510 can be a multi-threaded processor. The processor 510 can be further configured to process instructions stored in the memory 520 or on the storage device 530, including receiving or sending information through the input/output device 540. The memory 520 can store information within the system 500. In some implementations, the memory 520 can be a computer-readable medium. In alternate implementations, the memory 520 can be a volatile memory unit. In yet some implementations, the memory 520 can be a non-volatile memory unit. The storage device 530 can be capable of providing mass storage for the system 500. In some implementations, the storage device 530 can be a computer-readable medium. In alternate implementations, the storage device 530 can be a floppy disk device, a hard disk device, an optical disk device, a tape device, non-volatile solid state memory, or any other type of storage device. The input/output device 540 can be configured to provide input/output operations for the system 500. In some implementations, the input/output device 540 can include a keyboard and/or pointing device. In alternate implementations, the input/output device 540 can include a display unit for displaying graphical user interfaces.

Figure 6:
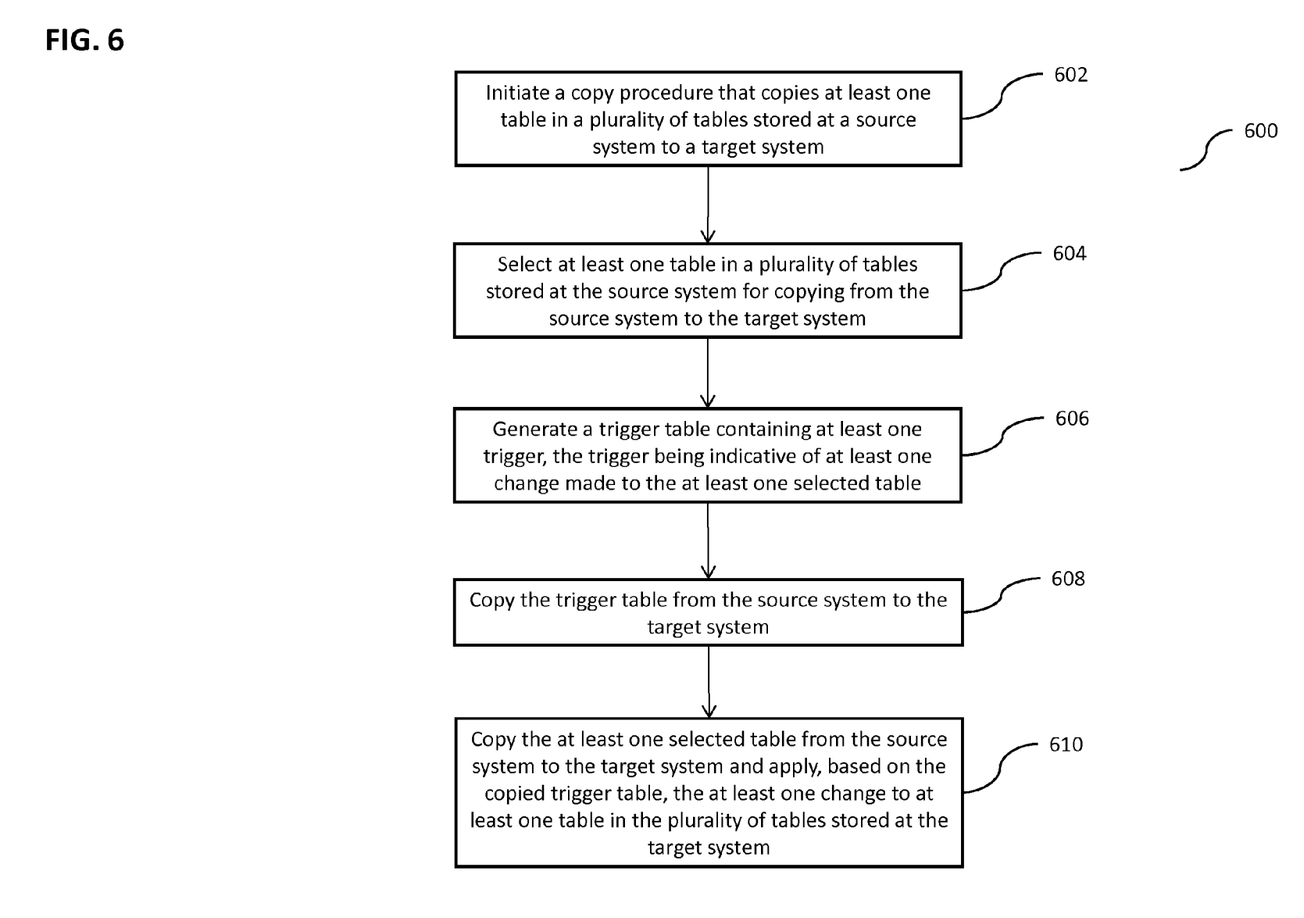
FIG. 6 illustrates an exemplary process for performing a copy procedure, according to some implementations of the current subject matter

FIG. 6 illustrates an exemplary process 600 for performing a copy procedure, according to some implementations of the current subject matter. At 602, a copy procedure that can copy at least one table in a plurality of tables stored at a source system to a target system can be initiated. At 604, at least one table in the plurality of tables stored at the source system can be selected for copying from the source system to the target system. At 606, a trigger table containing at least one trigger can be generated. The trigger can indicate at least one change made to the selected table. At 608, the trigger table can be copied from the source system to the target system. At 610, the selected table can be copied from the source system to the target system. Further, the changes to the copied table as well as any other tables can be applied at the target system using the trigger table.

In some implementations, the current subject matter can include one or more of the following optional features. The initiation of the copy procedure can include determining whether the source system is compatible with the target system. Upon determination of compatibility, the copy procedure can be initiated. Upon determination that the target system is not compatible with the source system, the copy procedure can be terminated.

In some implementations, the change(s) can include at least one of the following: an insert operation, a delete operation, and an update operation. The trigger table can include at least one change pointer key indicative of a change. The table can be selected from a data dictionary of the source system. The method can also include deleting the trigger table after the change(s) are applied to the tables at the target system.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A computer-implemented method, comprising:
   initiating a copy procedure that copies at least one table in a plurality of tables stored at a source system to a target system;
   selecting at least one table in a plurality of tables stored at the source system for copying from the source system to the target system;
   generating a trigger table containing at least one trigger, the trigger being indicative of at least one change made to the at least one selected table;
   copying the trigger table from the source system to the target system;
   copying the at least one selected table from the source system to the target system and applying, based on the copied trigger table, the at least one change to the at least one table in the plurality of tables stored at the target system; and
   deleting the trigger table after the at least one change is applied to the at least one table at the target system;
   wherein the at least one of the initiating, the selecting, the generating, the copying the trigger table, the copying the at least one table from the source system to the target system, and deleting is performed using at least one process of at least one computing system.

2. The method according to claim 1, wherein the initiating further comprises
   determining whether the source system is compatible with the target system, wherein upon determination of compatibility, the copy procedure is initiated;
   wherein upon determination that the target system is not compatible with the source system, the copy procedure is terminated.

3. The method according to claim 1, wherein the at least one change includes at least one of the following: an insert operation, a delete operation, and an update operation.

4. The method according to claim 1, wherein the trigger table includes at least one change pointer key indicative of the at least one change.

5. The method according to claim 1, wherein the at least one table is selected from a data dictionary of the source system.

6. A system comprising:
   at least one programmable processor; and
   a machine-readable medium storing instructions that, when executed by the at least one programmable processor, cause the at least one programmable processor to perform operations comprising:
      initiating a copy procedure that copies at least one table in a plurality of tables stored at a source system to a target system;
      selecting at least one table in a plurality of tables stored at the source system for copying from the source system to the target system;
      generating a trigger table containing at least one trigger, the trigger being indicative of at least one change made to the at least one selected table;
      copying the trigger table from the source system to the target system;
      copying the at least one selected table from the source system to the target system and applying, based on the copied trigger table, the at least one change to the at least one table in the plurality of tables stored at the target system; and
      deleting the trigger table after the at least one change is applied to the at least one table at the target system.

7. The system according to claim 6, wherein the initiating further comprises
   determining whether the source system is compatible with the target system, wherein upon determination of compatibility, the copy procedure is initiated;
   wherein upon determination that the target system is not compatible with the source system, the copy procedure is terminated.

8. The system according to claim 6, wherein the at least one change includes at least one of the following: an insert operation, a delete operation, and an update operation.

9. The system according to claim 6, wherein the trigger table includes at least one change pointer key indicative of the at least one change.

10. The system according to claim 6, wherein the at least one table is selected from a data dictionary of the source system.

11. A computer program product comprising a machine-readable medium storing instructions that, when executed by at least one programmable processor, cause the at least one programmable processor to perform operations comprising:
    initiating a copy procedure that copies at least one table in a plurality of tables stored at a source system to a target system;
    selecting at least one table in a plurality of tables stored at the source system for copying from the source system to the target system;
    generating a trigger table containing at least one trigger, the trigger being indicative of at least one change made to the at least one selected table;
    copying the trigger table from the source system to the target system;
    copying the at least one selected table from the source system to the target system and applying, based on the copied trigger table, the at least one change to the at least one table in the plurality of tables stored at the target system; and
    deleting the trigger table after the at least one change is applied to the at least one table at the target system.

12. The computer program product according to claim 11, wherein the initiating further comprises
    determining whether the source system is compatible with the target system, wherein upon determination of compatibility, the copy procedure is initiated;
    wherein upon determination that the target system is not compatible with the source system, the copy procedure is terminated.

13. The computer program product according to claim 11, wherein the at least one change includes at least one of the following: an insert operation, a delete operation, and an update operation.

14. The computer program product according to claim 11, wherein the trigger table includes at least one change pointer key indicative of the at least one change.

15. The computer program product according to claim 11, wherein the at least one table is selected from a data dictionary of the source system.

* * * * *